US010475086B2

(12) United States Patent
Bremer

(10) Patent No.: US 10,475,086 B2
(45) Date of Patent: Nov. 12, 2019

(54) WEB APPLICATION TOOL FOR INCREASING SALES IN STORES WHERE THROUGH THE USER INTERFACE OPERATORS ARE CONNECTED TO INTERNET PAGES DISPLAYED ON SCREENS THROUGHOUT THE STORE AND VIA THE USER INTERFACE THE STORE CAN CENTRALLY DIRECT, EVEN IN REAL TIME, THE SELLING/OFFERING OF PRODUCTS TO THE CUSTOMERS CHOOSING PRODUCTS IN THE SECTIONS COVERED BY THE INTERNET PAGES DISPLAYED ON SUITABLE SCREENS

(71) Applicant: Carl Mattias Bremer, Helsinki (FI)

(72) Inventor: Carl Mattias Bremer, Helsinki (FI)

( * ) Notice: Subject to any disclaimer, the term of this patent is extended or adjusted under 35 U.S.C. 154(b) by 180 days.

(21) Appl. No.: 14/944,420

(22) Filed: Nov. 18, 2015

(65) Prior Publication Data

US 2017/0140441 A1    May 18, 2017

(51) Int. Cl.
*G06Q 30/00* (2012.01)
*G06Q 30/02* (2012.01)
*G06F 3/048* (2013.01)
*G06F 3/14* (2006.01)

(52) U.S. Cl.
CPC ......... *G06Q 30/0277* (2013.01); *G06F 3/048* (2013.01); *G06F 3/1423* (2013.01)

(58) Field of Classification Search
None
See application file for complete search history.

(56) References Cited

U.S. PATENT DOCUMENTS

| | | | | |
|---|---|---|---|---|
| 7,613,630 | B2 * | 11/2009 | Wolinsky | G06Q 30/0241 348/584 |
| 8,644,550 | B2 * | 2/2014 | Basson | G10L 19/167 382/100 |
| 9,210,361 | B2 * | 12/2015 | Todd | H04N 5/45 |
| 2003/0115096 | A1 * | 6/2003 | Reynolds | G06Q 30/02 705/14.58 |
| 2006/0208070 | A1 * | 9/2006 | Kato | G06Q 20/203 235/383 |
| 2007/0208619 | A1 * | 9/2007 | Branam | G06Q 30/00 705/14.45 |
| 2008/0010654 | A1 * | 1/2008 | Barrett | H04N 7/163 725/32 |

* cited by examiner

*Primary Examiner* — Sunit Pandya

(57) ABSTRACT

The invention and product form a process enhancement with which one centrally in a simple way can increase and direct sales efforts "individually" to customers at different sections of a store. This creates an added service, is convenient, effectivises, creates worker wellbeing, is inexpensive and can lead to considerable financial gain.

6 Claims, 5 Drawing Sheets

WEB APPLICATION TOOL FOR INCREASING SALES IN STORES WHERE THROUGH THE USER INTERFACE OPERATORS ARE CONNECTED TO INTERNET PAGES DISPLAYED ON SCREENS THROUGHOUT THE STORE AND VIA THE USER INTERFACE THE STORE CAN CENTRALLY DIRECT, EVEN IN REAL TIME, THE SELLING/OFFERING OF PRODUCTS TO THE CUSTOMERS CHOOSING PRODUCTS IN THE SECTIONS COVERED BY THE INTERNET PAGES DISPLAYED ON SUITABLE SCREENS

A web application tool for increasing sales in stores. Through the user interface the operator/s is connected to internet pages displayed on screens throughout the store. Via the user interface the store can centrally direct, even in real time, the selling/offering of products to the customer as she is choosing products in the sections covered by the internet pages displayed on suitable screens.
Inventor: Carl Mattias Bremer. Finnish National. Residence: Helsinki, Finland.

REFERENCES

Cheryl Dileo Maranto 1991-1993 papers on music therapy.
Financial Times Jul. 7, 2014 www.ft.com/cms/s/0/0a7150ea-fe1f-11e3-b4f1-00144feab7de.html
www.ft.com/cms/s/0/0f9ad0bc-01ff-11e4-9af7-00144feab7de.html
Frances X. Frei, associate professor of business administration in the Technology and Operations Management unit at Harvard Business School in Boston.
Patrick Spenner and Karen Freeman, Harvard Business Review
Procter & Gamble
Roland Berger 2009 Convenience, Price and Diversity
Source Finnish Institute of Occupational Health. Guy Ahonen, http://www.ttl.fi/en/organization_management/Pages/default.aspx
www.accenture.com/us-en/Pages/insight-accenture-seamless-retail-survey-2014.aspx
http://www2.jordbruksverket.se/webdav/files/SJV/trlychsaker/Pdf_rapporter/rall_20.pdf
http://www.statista.com/statistics/239814/food-retail-losses-in-the-us/
http://www.statista.com/statistics/262075/amount-of-wasted-food-in-the-us-by-food-category/

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

I have researched all or most store chains in the world in order to find the most solid and technologically advanced chains competing successfully. I have further researched what these particular chains are doing and what they can do or implement in order to become even better. When studying the most important aspects of a stores profits be it a chain or a single store some aspects become more important than others. These aspects arise through competitive advantages, technical and other innovations or a locationally superior place or area of the store/s. The competition is always hardest within the store formats. (Agrifood Economics commissioned by the centre for competition in Sweden.) I.e. small stores compete harder with each other than a small and a bigger store. Therefore it pays to differentiate and innovate within the formats to achieve advantages. As can be done with the internet tool in question here. Price advantages are hard to uphold in the long run especially within the same format. (Agrifood Economics commissioned by the centre for competition in Sweden.) Which means it is very hard to achieve added sales and more return through price competition within the same format. Added sales and return should be sought in other ways. Such a way can be accomplished via the internet tool presented in this paper. "To Keep Your Customers, Keep It Simple" (by Patrick Spenner and Karen Freeman, Harvard Business Review.) The single biggest driver of stickiness, by far, was "decision simplicity"—the ease with which consumers can gather trustworthy information about a product and confidently and efficiently weigh their purchase options. What consumers want from marketers is, simply, simplicity." Our study found that the best tool for measuring consumer-engagement efforts is the "decision simplicity index," a gauge of how easy it is for consumers to gather and understand (or navigate) information about a brand, how much they can trust the information they find, and how readily they can weigh their options. The tool provides this as simply as possibly in sections of comparable products. 70% of all brand choices happen in the store, 68% of all purchases are unplanned and 5% of customers are loyal to 1 brand. (Procter & Gamble) Directed sales efforts with the tool are thus value adding. Any of these four elements—the offering or its funding mechanism, the employee management system or the customer management system—can be the undoing of a service business. (Frances X. Frei, associate professor of business administration in the Technology and Operations Management unit at Harvard Business School in Boston.) Managers should discover the relative importance customers place on attributes and then match the investment in excellence with those priorities. At Wal-Mart, for example, ambience and sales help are least valued by its customers, low prices and wide selection are most valued, and several other attributes rank at points in between. ("Wal-Mart's Value Proposition" in David J. Collis and Michael G. Rukstad's article "Can You Say What Your Strategy Is?") The application tool gives both a personalized service and provides ideas inexpensively with or without ambience and as part of the wide or any other type of selection. Thus providing a tailor made solution for most stores.

"Roland Berger 2009 Convenience, Price and Diversity" are the 3 most important factors when a customer chooses a store "Convenience can be seen as depending on total time spent in shopping and on the value of the time spent (Roland Berger 2009)" (Supporting the process improvement outcome here). And Accenture's 2014 study on 15.000 buying customers in 20 countries."40 percent of respondents ranked improving the in-store customer experience as first, compared to just 16 percent who said the same of online shopping. (Supporting the process improvement outcome here)" www.accenture.com/us-en/Pages/insight-accenture-seamless-retail-survey-2014.aspx In Financial Times Jul. 7, 2014 there was an article on what big supermarket chains in the world are starting to do right now. Supermarkets are investing in efficiency, shrinking and increasing the convenience of their stores. This is true especially among discounters. Wal-Mart, Tesco, Aldi, Lidl, Morrison's, Sainsbury's, Carrefour etc. are all planning changes or additions. It has become evident that customers look for convenience not only the cheapest price as has been the thought earlier.

The process at issue here leads to efficiency, worker wellbeing, increased convenience, more service and more return or more pricing power in the most ecological way. The process is thus also in line with what the customer wants leading to possibly lower prices through process improvements, a more motivated workforce and more efficiency.

Jul. 6, 2014 Retail
Wheels coming off the supermarket trolley
Shift to discounters and small stores leads to refocusing
www.ft.com/cms/s/0/0a7150ea-fe1f-11e3-b4f1-00144feab7de.html
Jul. 6, 2014 Retail
Supermarkets downsize for convenience
Race for space adapts to changing shopping habits
www.ft.com/cms/s/0/0f9ad0bc-01ff-11e4-9af7-00144feab7de.html When comparing to online sales alternatives a physical store offers many goods on display and the customer can feel, smell and see the real products before making a purchase decision. This fact and advertisement related to ideas for the senses and spur of the moment purchases differentiate the physical store from an online alternative.

Once the customer has chosen to come to the store one can provide ideas to the customer in order to increase sales. Price is important and price can be used to interest the customer to purchase an item. Within the tool added product ideas, recipes and the like are offered to the customer. The customer arrives at a shelf to buy a certain item. This same item is offered on the screen with e.g. 1-3 other items that form an idea or recipe for the main item. If the customer chooses to buy the idea more sales are created. The tool is also convenient in directing offers to reduce food spill in stores, which constitutes about 5% of all food, as expiration dates draw closer. Americans wasted fresh vegetables worth of 27.1 billion U.S. dollars. In total, food worth of about 180 billion U.S. dollars was wasted by households, supermarkets, restaurants and other food service providers in the United States in 2012.
http://www2.jordbruksverket.se/webdav/files/SJV/trycksaker/Pdf_rapporter/ra11_20.pdf
http://www.statista.com/statistics/239814/food-retail-losses-in-the-us/
http://www.statista.com/statistics/262075/amount-of-wasted-food-in-the-us-by-food-category/

Further it is a cheap way to increase sales in many places of the store. This can conveniently be done with a sustained price image as the tools focus is to sell more products e.g. alongside of a main product already chosen by the customer. If 10% of a stores customers buy one item more it creates a considerable sales and profit increase.

The customers see this as a convenient added service which content is easily and quickly controlled centrally by the store. It is also suitable for both upmarket as well as discount stores. The tool and its input relies conveniently on the stores staff expertise and therefore has an advantageous cost structure as well as creates a better working atmosphere. As such it is suitable in both normal stores and stores using self-scanning equipment.

The returns can grow quite large. In a store with 7 screens that manages to sell 50 normal additional small products per screen per day for 5 days a week during a year increases its yearly return by $335.000,—(based on prior research.). Implementing the tool in a small store with approximately 2.100 daily customers, a real example. The store is situated near a shopping mall and is a smaller store, the smallest at the location. One of its advantages previously was longer opening hours governed by legislation. This advantage was removed at the turn of the year and opening hours were set free for all stores. This meant that large supermarkets and all other stores around this store now are open during the same hours. Competition at this location is thus within the segment and outside of it. The store is not a discounter and has higher or normal prices. One can say that prices are among the highest by comparison. When one considers this the tool is faring very well. After starting off at +220$ more return a week and quickly rising to +550$ a week that turned to +880$ a week in a couple of months time, for displayed products with 4-5 screens. A little Later this figure punched through +1100$ added return per week. To give you a picture of the landscape the store is surrounded by supermarkets in all directions within a 200 m radius. Two very large supermarkets with low prices and high quality products for all occasions. One Lidl (discounter) with by far the lowest prices of them all, which has brought the Lidl chain around 15% market share of the whole market in recent years. A smaller supermarket similar to the larger ones but in another direction with many similar product groups as the smaller store but cheaper. And lastly a semi discount chain local store slightly larger than the smaller store. The competition is rock hard I would say. This is exacerbated by the negative GDP of Finland and downturn like conditions presently. The stores customers have been influenced in a positive way by the tool and displayed products are experiencing increased sales and return thanks to the displays. The service has been delivered by giving daily ideas to the customers using the tool not relying on price rebates. The average weekly return increase has been 890$, the average weekly return increase compared to the reference week before the tool is 630%, the average weekly return increase compared to the reference week average before the tool is 372% and the average weekly return increase compared to the previous week is 108%. The period in question is March-September. That underlines the function of the product and proves that one can indeed increase return like this in a positive way as described here. The store lost customers after the opening hours were set free as people could buy the same things more cheaply and choose from a greater variety from other nearby stores. Thus the strategy and tool counteracts this fact. The achievable returns rely on total customer numbers and usage of the tool. However, the numbers have been achieved from scratch and with no previous experience. It is important to know the customer and what they may like. Something that the store staff does.

For the result to be as good as possible the input in the tool is important relying on ideas, recipes, knowing the store and knowing the customer. This puts the store manager and the staff in focus. It provides a great opportunity to extract some added positive effects from the tool.

The most important things in a successful organization are tackled or included in the tool concept. An organization directed towards, cooperation acceptance and renewal strengthens employees' self-image and may release some hidden resources and talents. An energizing and cooperating atmosphere among employees drives everybody forward. The biggest benefits are achieved when employees feel and see that they can contribute to achieving the organizational goals. As the staff is involved in the tools input the above is realized.

An environment like the one described is the most important resource affecting competitiveness, result and image. A rule of thumb is that one Euro invested in the working atmosphere pays itself back 6 fold. Measured in profits it has been shown that the difference between the highest and lowest quartile of businesses that have achieved a work atmosphere like the one described above is around 1 million Euros per department and per year. (Source Finnish Institute of Occupational Health. Guy Ahonen, http://www.ttl.fi/en/organization_management/Pages/default.aspx)

BRIEF SUMMARY OF THE INVENTION

Increasing sales, convenience, adding a service, bettering worker atmosphere and reducing food spill can be achieved relatively inexpensively with this internet web application working for both normal and self-scanning stores. The web application tool and its user interface can be uploaded with different product pictures, appropriate varying text can be inserted on the pictures, sound or music can be added as well as film type product advertisement related to the designated internet pages visible on the designated screens. The material is thus created separately for each internet page linked to the user interface. These internet pages are shown on designated screens in the store. Calming and pleasant associations can also be created with music suitable to the products and themes. (Dileo-Maranto 1991-1993 papers on music therapy.) This can be true for other sounds as well.

These designated internet pages are then accessed (wirelessly, most convenient) by the screens in the store. The content is supplied by the store staff and uploaded into the tools user interface database folders. The purpose of the tool is to sell more products for example alongside a lead product that the customer is looking for at the location of the screen. The tool also draws the customers' attention to products. The tool functions on all internet enabled devices. The screens attached in the store, conveniently for the customer to view while shopping, carry a wireless receiver device to receive the tools user interface content designated for each internet page and screen. The tools interface is operated by a store computer, tablet, phone or other device with internet connection.

The screen content can swiftly be centrally changed through the user interface to accommodate needs, themes and supply. The screens are conveniently and visibly located at the different product sections in the store. This is important as the store is apart from a "large warehouse" also a place where advertising and influence is possible to a greater extent than for example through online sales, recall P&G quote. The tool creates a service, increases convenience and increases return in stores. Apart from more sales for the store the tool can contribute to less food spill and an improved worker/ing atmosphere in the store.

DETAILED DESCRIPTION OF THE INVENTION

Figure 1:
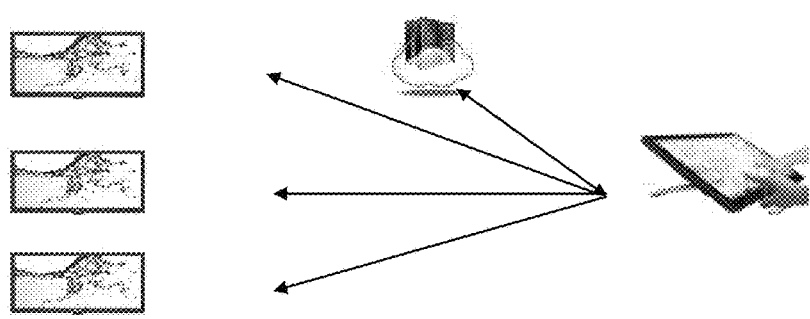
FIG. 1. System parts of the web application in a store.
Figure 2:
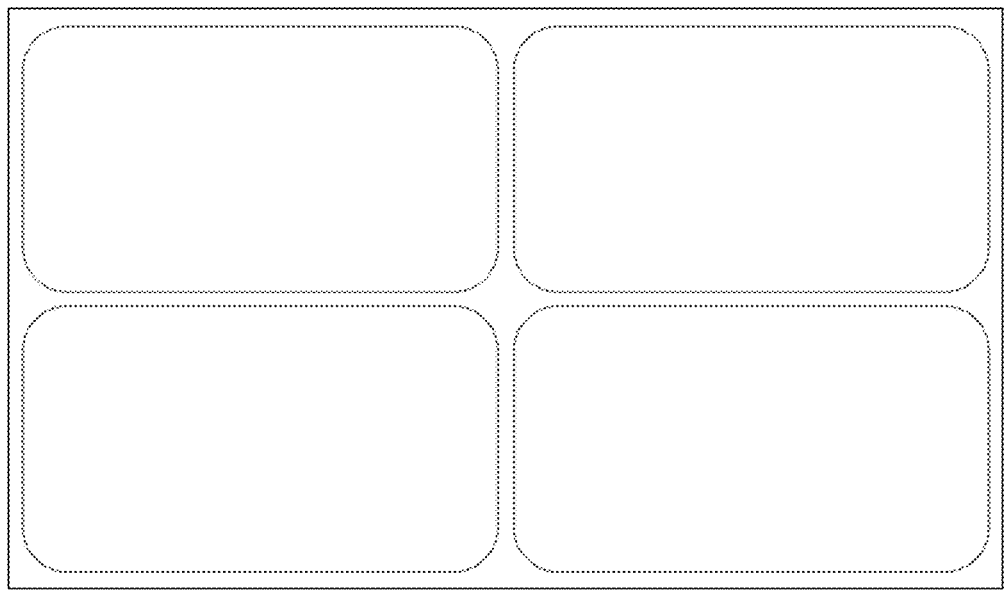
FIG. 2. The web application tools internet page accessible by the screens. This view has 4 product spaces. Thus on this page a 1+3 idea or recipe can be presented or just a combination of 4 products that go well together. The view can also show less than 4 products.
Figure 3:
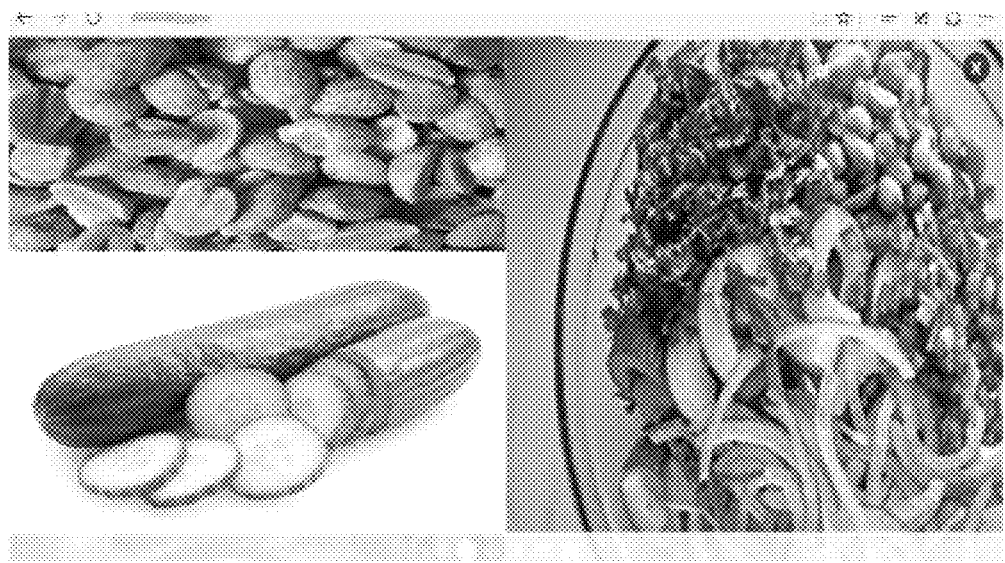
FIG. 3. Product combinations on the product page near the vegetables. An attractive product on display creatable by two products on the page. The extra product here are the peanuts.
Figure 4:
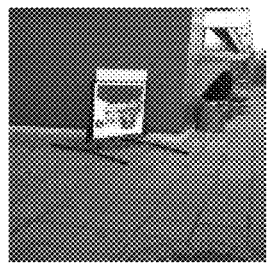
FIG. 4. Sometimes product sales are used to invite customers to stores.
Figure 5:
FIG. 5. Product sales are used to get the customers attention at shelfs. Sometimes for products with an expiry date drawing near.
Figure 6:
FIG. 6. A screen in the vegetable section displaying e.g. the salad combination of the day.
Figure 7:
FIG. 7. Screens with ideas at the refrigerated meat section.
Figure 8:
FIG. 8. Screen with ideas in the canned food and seasoning section.
Figure 9:
FIG. 9. Screens with ideas in the fresh food and bread sections.
Figure 10:
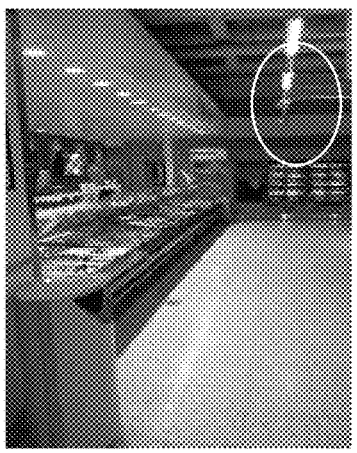
FIG. 10. Security cameras covering most isles in a store as well as screen locations providing a convenient way to offer up to date and real time content via the screens to customers.
Figure 11:
FIG. 11. Security cameras covering most isles in a store as well as screen locations providing a convenient way to offer up to date and real time content via the screens to customers.

The central user interface of the web application provides tools to create one or several internet pages with designated addresses that are accessible by screens in the store. The tool works over the internet. Thus the screens are fitted with a wireless receiver (built in wifi) or in another way connected to the internet. The screen or screens are attached in the store at different goods sections. The placement is where it is best visible to all customers for that particular merchandize section. The central interface is operated through any device connected to the internet. I.e. a computer, tablet, mobile or other. There can possibly be more than one user interface open at a time depending on the place of use. The interface provides separate views for each page so that different content can be uploaded to every screen in the store. The internet pages can show pictures of the offers to which visible text can be added. Each page can show 1 or many pictures or offers. Sound and music can also be uploaded to play in association with the pictures or standalone from the pages. This sound can also be added real time for example when a customer walks into the section so as to draw attention to whatever is on offer. Hence more than one user interface can be accessed at the same time. Content from security cameras usually covering every isle in a store can also be used by the tool interface controller to adjust and present screen content and sound for the customer in real time. Film clips can also be added.

The tool is a convenient and inexpensive way to create sales in stores. The sales can be adjusted to circumstances and the sales presentation can even function in real time. Thus convenience and a service is relatively cheaply created with large potential added sales to be had. A reduction in food spill can be created with the tool as sales efforts can be directed at products nearing their expiry date. On average about 5% of store food is wasted. The highest waste % are in fresh, meat and fish products. Usually over 10% of fresh food is thrown out making even small % improvements valuable. (ref:statistics) This can be accomplished with mentioned hardware and software investments constituting this product.

When staff and managers take part in forming the content of the sales material they get involved in increasing the store return. An organization directed towards, cooperation, acceptance and renewal strengthens employees' self-image and may release some hidden resources and talents. An energizing and cooperating atmosphere among employees drives everybody forward. The biggest benefits are achieved when employees feel and see that they can contribute to achieving the organizational goals. An environment like the one described is the most important resource affecting competitiveness, result and image. A rule of thumb is that one Euro invested in the working atmosphere pays itself back 6 fold.

The invention claimed is:

1. A method for improving store operation by operating a store tool made of tablets with a wireless device and wireless capabilities with sound and changeable and accessible screens with an application, connected to a database, consisting of 2 types of user interfaces, a central interface and a user interface with content folders swiftly operated and changeable and accessible via designated internet pages by the staff in a store at product places, with a wide variety of storage constructions, displaying changeable and accessible content to customers at placements in real time, said store tool functions on said tablets with said application allowing changeability and accessibility, in real time, for said staff while performing daily tasks in said store, said tablets with said application working wirelessly for movability operated by said staff and managers allowing and demanding said staff and said managers, daily, to create, change, supply and upload product ideas, text and sound, not relying on price rebates, said product ideas combining 1-3 products at a time with said store's lead products to said tablets with said application and as directing said tablets with said application to correspond to products depicted in said product ideas providing value added by increasing return through changing, creating and supplying content displayed and directing sales to other products with said tablets with said application, work atmosphere through changing, creating and supplying content daily with said tablets with said application, return achieved with said tablets with said application, attention in areas where supplying content with said tablets with said application, service through providing said product ideas for said lead products in said store, increasing sales of expiring products especially in the fresh food, meat and fish section through directing, changing, creating, supplying and adding content with said tablets with said application at said expiring products and creating inexpensive sales in said store through supplying content created by staff, with said tablets with said application forming advertisement and pleasant associations, comprising:

providing said tablets with said wireless device with said sound and said changeable and accessible screens and with said application consisting of said 2 types of user interfaces, said central interface and said user interface, viewable through said designated internet pages connected to said database, controllable by said staff and said managers directly in said store functioning on said tablets showing and playing provided content at their respective said placements in said store to said customers via said user interface or user interfaces that can be controlled by said central interface;

providing said tablets with said application with said user interface or interfaces in said store controlled by said staff with one set of said content folders for pictures, pictures with text, text and moving pictures and sound or music and another set of said content folders for similar content, but in multiple picture display making one or many said product idea combinations creatable, changeable, accessible, suppliable and uploadable in said store by said staff, while doing daily tasks, on the same internet page, with the possibility to create and combine text and said product ideas in one or many picture combinations and sizes on the same internet page with said product ideas and ad text corresponding to each said product idea in said content folders on any interface, so that each set of said content folders are connected to said designated internet page that shows and plays the corresponding said product ideas on that interface's said designated internet page on said tablet with said application, in real time;

providing said tablets with said application with said central user interface, operable through said designated internet page, through which said user interfaces' internet pages can be created, functioning on said tablet or a computer or a mobile phone device connected to the internet controlled by said manager or said staff with the same said user interface functions, said content folders and said text adding capabilities for each said user interface in said store or stores;

providing said wireless device in said store for said operation of said tablets with said application always enabling possibility of display at said placement with products chosen in said content especially in said fresh food, meat and fish section where there are shelves, trays and a wide variety of other storage constructions;

providing said content by said staff and said manager forming said advertisement, increasing said value added at said placements by uploading said product ideas, not relying on price rebates, corresponding to products at said placement directly via said user interfaces' said designated internet pages displayed on said tablets with said application, preferably in said fresh food, fish and meat sections where food waste is the highest and at said expiring products or at other selling times uploading said sound or music to products creating said pleasant associations and added text for added said attention at the location of products;

providing said staff and said manager with said tablets with said application to change and provide said content for products daily, during the day and in real time, while doing daily tasks, via said user interfaces' said designated internet pages for products at said placements and direct sales towards other said expiring products adding more said attention in the form of said sound or music and said text to said content close to expiry of said expiring products in said store to increase said value added.

2. Method of claim 1, wherein said database linked to said tablet with said application using said wireless device provide a swift said store tool that shows, and plays said content used at the time among corresponding interfaces' said designated internet pages on said tablets in said store making directing sales to other products inexpensive, swift and in real time possible;

said user interface with said content folders are shared with said corresponding central interface with said content folders enabling said content uploading either through said central interface using said application with said tablet or a computer or a mobile phone device or, directly through said user interface using said tablets with said application in said store enabling a swift centrally or individually controlled said content management in said store, in real time for said customer;

said user interface has said content folders shared with said central user interface that show and play on the same said user interface's said designated internet page on said tablet with said application in said store enabling said content change swiftly and in real time; said central interface controlled with said tablet or a computer or a mobile phone device using said application shares and lists all said user interfaces' said content folders, making uploading or changing said content centrally to all said user interfaces on said tablets with said application swift and in real time possible.

3. Method of claim 1, wherein said tablets with said application with said wireless device operates wirelessly for swift and real time changeability and accessibility of said content to correspond to other products chosen by said staff, while doing daily tasks, when adjusting said tablets with said application in said store to changing said content and said expiring products, when directing sales in said store or stores.

4. Method of claim 1, wherein said staff and said manager create or supply and upload said content to said tablets with said application, in real time, for said customer, said product ideas displaying said store's 1 said lead product combined with 1-3 products forming said product idea corresponding to said tablets with said application at said placements' products with said corresponding text enabling swiftly showing one or many said product ideas on the same internet page for products and when directing sales and said content at said expiring products;

and adding said sound or music, swiftly and in real time for said customer, to said tablets with said application with said interface with said content folders for said attention, creating said pleasant associations, playing by products or when directing sales at said expiring products in said store.

5. Method of claim 1, wherein said staff and said manager form said advertisements, in real time, by uploading said content and said product ideas to said tablets with said application with said interface with said content folders directly in said store related to said fresh food, meat and fish dishes, not relying on price rebates, as well as directing sales with said content at said expiring products and changing and accessing said content at said placements, said staff have decided or been ordered to manage in said store;

and providing said return achieved and sales by said staff with said store tool's said tablets with said application and said work atmosphere for said staff, said manager and said store, resulting in said return increase, said attention, and said increasing sales of expiring products in said store achieved inexpensively by said staff with said store tool.

6. An inexpensive and swift store tablet tool with a wireless device, with wireless capabilities, with sound and changeable and accessible screens with an application consisting of 2 types of user interfaces accessible simultaneously, a central interface and a user interface with content folders accessed through the internet and designated internet pages connected to a database operated by staff in a store at product places displaying swiftly changeable and accessible content forming advertisement to customers in real time, comprising:

said store tablet tool with said wireless device with said wireless capabilities with said changeable and accessible screens with said sound with said application consisting of said 2 types of user interfaces, said central interface and said user interface with said content folders wirelessly connected to said database and said designated internet pages swiftly subjecting created and supplied content of pictures, pictures with text, text and moving pictures and sound or music content used at the time to said customers at said product places in said store, in real time, that swiftly can be changed and accessed;

said store tablet tool with said application with said 2 types of user interfaces where 1 group of said user interfaces' said content folders' said content are swiftly and in real time individually changeable, accessible and uploadable with said content displaying on said designated internet pages on said store tablet tool corresponding to said user interfaces and, a 2nd said central interface through which corresponding said designated internet page on said store tablet tool or on a computer or a mobile phone said user interfaces' said designated internet pages can be created and all said user interfaces' said content folders' said content can swiftly and in real time be changed, accessed and uploaded with said content;

said store tablet tool with said application with an interface with said designated internet page can swiftly play and show one said content or many said content uploaded to its said content folders or many said content on the same said designated internet page and allow said changing and accessing of said content for said customer, in real time, as chosen;

said store tablet tool with said application with an interface with said designated internet page can have said text added and said content can contain said text changeable and accessible through the corresponding said designated internet page;

said store tablet tool with said application with an interface with said designated internet page can play said music or sound uploaded to its said content folders through the corresponding said designated internet page;

said store tablet tool with said application with an interface with said designated internet page can present said content swiftly and in real time for the customer;

said store tablet tool with said application with interfaces with said designated internet pages can be changed and accessed simultaneously from many interfaces;

said application is changeable and accessible through said internet; and said store tablet tool's said wireless capability and said changeable and accessible screens enable directing said content swiftly towards different said product places in said store at any time.

* * * * *